Sept. 26, 1967  S. NEWELL  3,343,809
ROPE PULLING DEVICE
Filed March 27, 1967  2 Sheets-Sheet 1

INVENTOR.
STROHM NEWELL
BY
Tom Sherrard, atty

Sept. 26, 1967  S. NEWELL  3,343,809
ROPE PULLING DEVICE
Filed March 27, 1967  2 Sheets-Sheet 2
FIG. 6
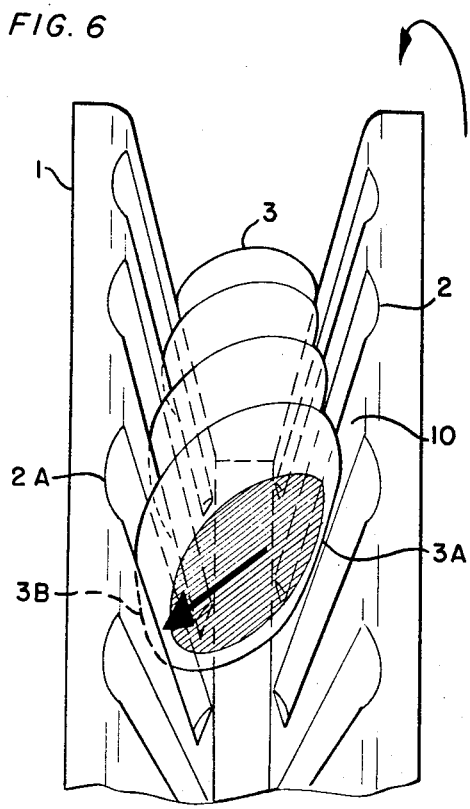
FIG. 7
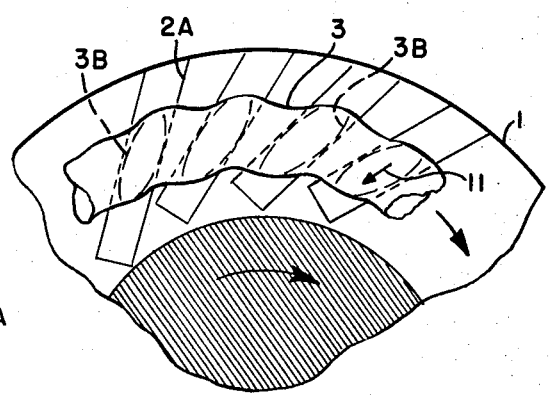
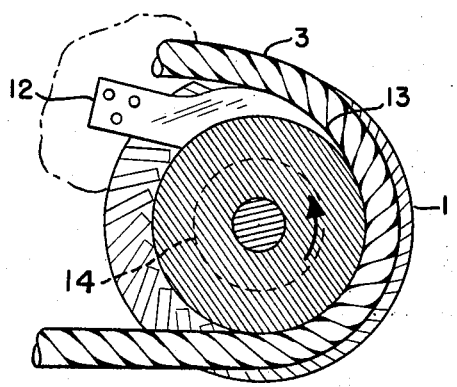
FIG. 8
FIG. 9
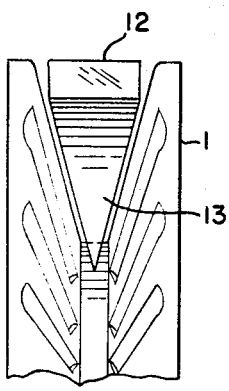
FIG. 10
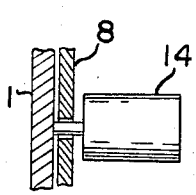
INVENTOR.
STROHM NEWELL
BY
Tom Sherrard, atty.

United States Patent Office 3,343,809
Patented Sept. 26, 1967

3,343,809
ROPE PULLING DEVICE
Strohm Newell, 2256 Albatross,
San Diego, Calif. 92101
Filed Mar. 27, 1967, Ser. No. 629,351
4 Claims. (Cl. 254—134.3)

ABSTRACT OF THE DISCLOSURE

My invention is a device for pulling and securing rope. It includes a power driven disk with annular groove having a V-shaped cross section. Bearing surfaces are transversally spaced around the periphery of the inner faces of the grooves. Gripping, without slippage occurs when a taut rope wedges into the groove and against the bearing surfaces.

The present application is a continuation-in-part application of my application having Ser. No. 528,519, filed Feb. 18, 1966, and which is now abandoned.

Background of the invention

My improved device is structured for use in lineal movement or securing of a load attached to a rope. The present method of pulling such rope is with a winch. The well-known disadvantages of a winch may now be avoided. For example, the application of manual labor to keep tension on a rope is not needed. Slippage of the rope is obviated with my assembly. Pulling a rope of any length for any distance may now be accomplished without winding the same on a drum or the like. Use in power-take-offs on trucks; pulling wire through conduits and hoisting loads of great weights for various distances are examples of the use of my device. When it is used to secure rope under tension, disk rotation of only 120 degrees is sufficient for all requirements.

Description of the prior art

All prior art depends on friction reducing means. For example Benedict Patent No. 3,078,074, has ridges and grooves which radiate from the center area of a "pulley." This may be effective for the stated use as a boat anchor windlass.

Other V-type pulleys are used to continuously run mechanisms in place and instead of belts or chains. These do not have transverse ridges and grooves. The ridges and grooves are not positioned to take advantage of the twists of ropes. Such pulleys would permit the rope to slip if subjected to the lineal pulls demanded of my device.

Summary of the invention

A disk-shaped member is provided with a groove completely around the periphery thereof. Tapered inner walls of the groove have semi-cylindrical recesses channeled out of the surfaces thereof. These recesses are spaced equi-distance from each other. They are positioned transversely in respect to a shaft through the center of the member. A power source is secured to said shaft for rotating the disk-shaped member. A rope engages with the recesses in the groove and follows an arcuate path around the major portion of the disk-shaped member. An idler wheel helps guide the rope into the groove and a finger helps disengage the rope from the recesses. A load attached to the end of the rope is pulled in the direction of rotation of the member as it is driven by the power source.

Brief description of the drawing

FIGURE 6 is a diagram showing the rope meshing into a double structured groove.

FIGURE 7 is a diagrammatic view from the cutaway side of the periphery of the disk showing the position of the rope when in use.

FIGURE 8 is a cutaway side view of the disk showing the finger acting upon the rope.

FIGURE 9 is a detail from the edge of a portion of the disk showing the position of the finger in respect thereto.

FIGURE 10 is a detail showing the power source.

Description of the preferred embodiments

Figure 1:
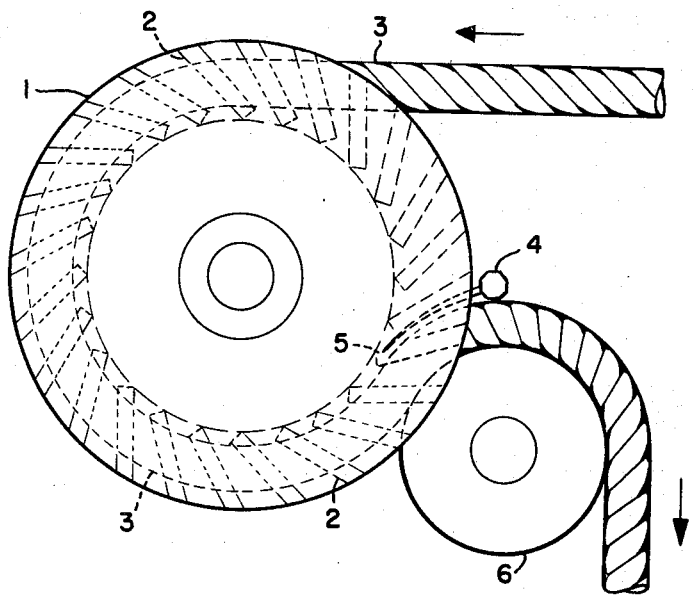
FIGURE 1 is a diagram showing the path of the rope in my device.
Figure 2:
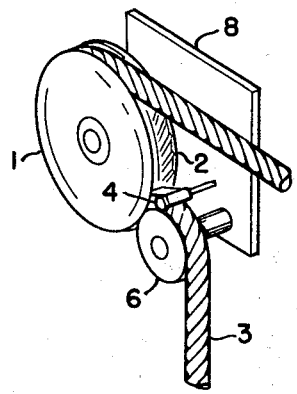
FIGURE 2 is a perspective view of a form of my device.

In FIGURE 1 the numeral 1 represents a disk-member with an annular groove having a V-shaped cross section. It is preferably made of a light metal such as aluminum. Its center is secured to a shaft (not illustrated) disposed at a 90 degree angle to the surface thereof for rotation in unison therewith. The shaft is journaled in a suitable support 8. The support may be of various sizes and shapes and may retain other members of my novel assembly as is shown in FIGURE 2.

A conventional power source, item 14 of FIGURE 10, rotates the shaft and disk. Such power source may be an electric motor with worm gear. An optimum speed of approximately 15 r.p.m. may then be maintained.

One or both of the inner faces of the groove are transversally channeled out, semi-cylindrically, to form a series of ribs 2 completely around the inner periphery of the groove. The ribs have a wave-like appearance with grooves or troughs 2A and flattened crests 10, best seen in FIGURE 6. An optimum angle of approximately 45 degrees exists between the sides of each rib and the radius of the disk. The ribs are uniform in size and shape. They are equi-distant apart. The size of the disk determines the number of ribs, the twists of the rope determine their size and angle. They are straight rather than arcuate. They are more tangential than radii vectors.

When the form of my invention having a dual series of annular ribs is employed, I find that the top or crest of one rib is best formed to align with, and be oppositely disposed to, the crest of a rib channeled out of the other groove face. See FIGURE 6. This reduces the danger of rope slippage on heavy pulls, as described later. This alignment utilizes the "twist" feature of the rope strands.

A rope 3 is an essential part of my novel combination. I prefer to use nylon rope with twisted strands as shown. This is available on the open market. Woven or other rope may be used without departing from the scope of my invention. Rope of three-fourths or one-half inch diameter is chosen for frequent use.

A rope retainer 6, being preferably an idler wheel or roller, is associated with the disk as can be seen in the first two figures of the drawings. It prevents the rope from leaving the groove too soon.

Proximate thereto is a rope guide 4. This guide may be of various forms. All are tapered in shape to fit into the V-groove.

I find that a shoe or finger 12 secured to support 8 is an excellent guide for loads or pulls of great resistance.

Figure 4:
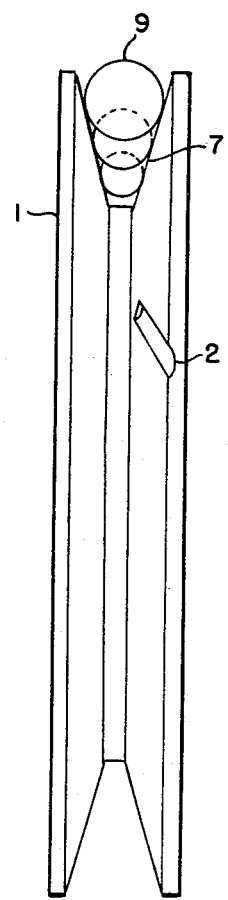
FIGURE 4 is a diagram showing the rope in the groove.
Figure 5:
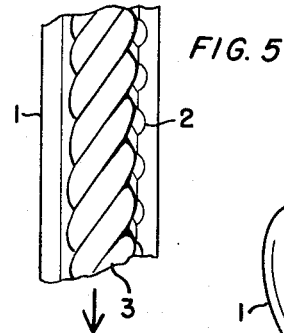
FIGURE 5 is a detail showing the rope meshing into the groove with one face smooth and the other face structured with meshing means.
Figure 3:
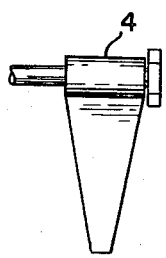
FIGURE 3 is an end view of one form of the finger portion of my device.

One end of the rope 3 is secured to a load to be hoisted or to an object to be pulled. A section of the rope is placed in the V-groove in an arcuate path to the point of contact with guide 4 or 12. This is more than one-half the circumference of the disk. As power is applied to the disk the load resistance causes the rope to become taut. It tends to seat in the groove. The pitch of the V-section of the groove and the diameter of the rope are so related that the rope fits into the groove without reaching the bottom. Attention is directed to item 9 of FIGURE 4 showing the rope position as it enters the groove and item 7 showing its position as force is applied. Continued power moves the disk and rope in the direction of the arrows. As in FIGURE 6, each flattened crest 10 abuts a "twist" of rope 3 at 3A forcing it into a recess or trough 2A of the opposite rib. The rib's lateral face 3B moves the resisting rope by positive, non-slip abutment. Because of the twisted and non-compressible form of rope the crest 10 of one side of the groove forces the strands of the approaching "twist" of the rope into the preceding trough on the opposite side of the groove. The taper of the groove tends to cause the "twist" to move in the direction of arrow 11 of FIGURE 7. As any particular portion of the rope completes more than one-half the distance around the circle it comes into contact with the guide at point 5 of FIGURE 1. The resulting contact of the rope on guide surface 13 (as in FIGURE 9) lifts the rope from the groove. In this manner the resistance of the load is overcome in manner substantially equivalent to that taking place when gears are meshed.

Although preferred embodiments of my invention are shown and described, it is understood that one skilled in the art may make modifications thereof which will fall within the scope of my subjoined claims.

What is claimed is:
1. In a rope pulling device the combination of:
  (a) a disk member, and,
  (b) an annular groove with a V-shaped cross section provided on the periphery of the disk member, and,
  (c) a plurality of ribs and troughs transversally disposed at regular intervals on the inner lateral face of said groove, and,
  (d) a lineal pull rope operatively mounted in said groove whereby its strands mesh with lateral surfaces of the ribs, and,
  (e) a power source which is operatively connected to the disk member, and,
  (f) a support upon which the disk member is rotatably mounted.
2. The claim according to claim 1 above wherein the crests of one ring of ribs is aligned with the troughs of an oppositely disposed ring of ribs.
3. The claim according to claim 1 above wherein a rope retainer is mounted for contact with the rope as it recedes from engagement.
4. The claim according to claim 1 above wherein a rope guide is provided in association with the disk member to cause unmating of the rope and ribs.

References Cited

UNITED STATES PATENTS

| | | | |
|---|---|---|---|
| 26,707 | 1/1860 | Planer | 74—230.5 |
| 1,847,177 | 3/1932 | Freedlander | 74—229 |
| 3,043,926 | 7/1962 | Rabeux et al. | 242—155 |
| 3,078,074 | 2/1963 | Benedict | 254—175.5 |

OTHELL M. SIMPSON, *Primary Examiner.*